May 22, 1928.
J. MENSCHAERT ET AL
1,670,976
FISH PLATE FOR RAILWAY RAILS
Filed Aug. 22, 1927
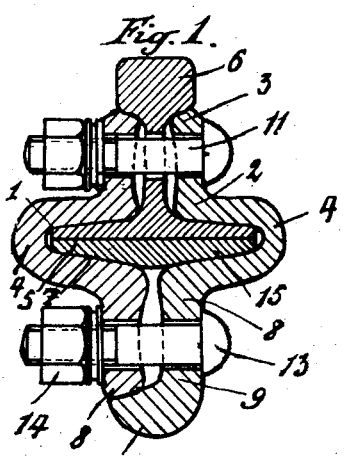
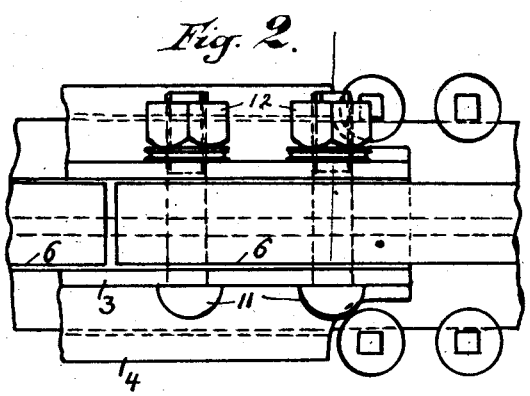
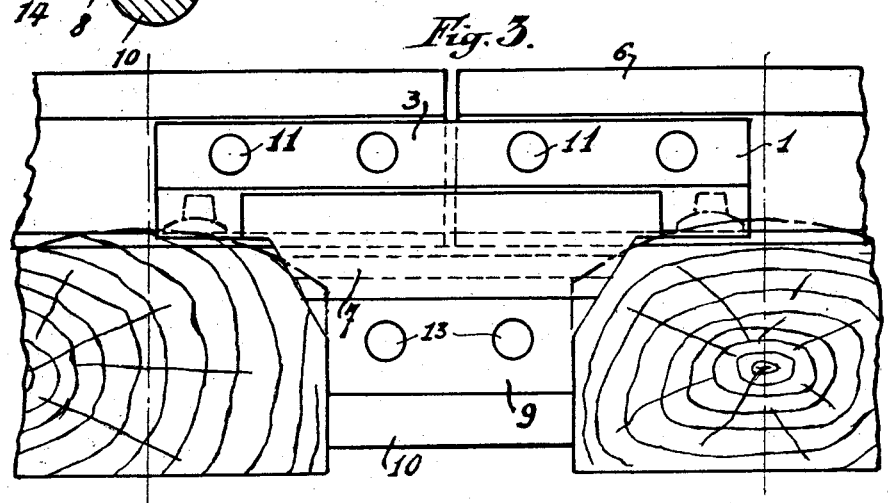
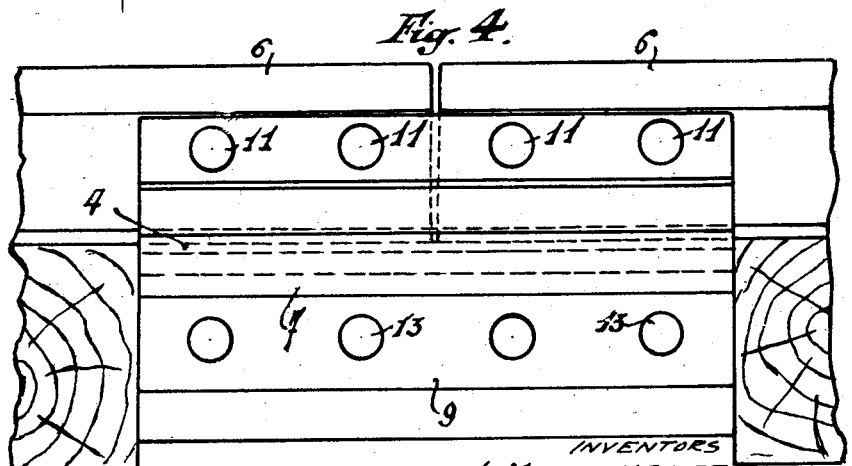
INVENTORS
J. MENSCHAERT,
M.V.J. MENSCHAERT, Patented May 22, 1928.

1,670,976

UNITED STATES PATENT OFFICE.

JOSEPH MENSCHAERT AND MARCEL VIRGILE JOSEPH MENSCHAERT, OF PATURAGES, BELGIUM, ASSIGNORS TO ACIERIES DE HAINE ST. PIERRE ET LESQUIN, SOCIETE ANONYME, OF HAINE ST. PIERRE, BELGIUM, A COMPANY.

FISHPLATE FOR RAILWAY RAILS.

Application filed August 22, 1927, Serial No. 214,726, and in Belgium August 27, 1926.

Our invention has for its object a system of fish plates for railway rails. It has for its purpose to provide a system of fish plates giving a perfect assembling at the joint, reinforcing the solidity of the rails, preventing the ends of the rails from uniting and maintaining at the joints the original stability of the railway.

With this object in view our invention essentially consists in the special arrangements and combinations of parts as hereinafter fully described and pointed out in the appended claims.

Referring to the annexed drawings which show an example of embodiment of the invention:

Fig. 1 is a transverse section of a rail of the Vignole type, at the place secured by the fish plates.

Fig. 2 is a plan and Fig. 3 a side elevation.

Fig. 4 gives a side elevation of an alternative construction.

As shown more specially in Fig. 1, the system of fish plates comprises for each rail joint two fish plates 1 and 2 provided with upper flanges 3 having the shape of fish plates commonly in use, in order to permit the use of the ordinary accessories (bolts, washers, etc.).

These flanges 3 are each extended by a half rounded central portion 4 surrounding the base 5 of the rail 6. The half rounded portions 4 are continued under the base 5 by sloping flanges 7, down to the vicinity of the vertical plane through the axis of the rail, where they end with lower cheeks 8, concave internally at 9, so as to give the resiliency necessary for the tightening. The lower cheek 8 of one of the two fish plates ends with a shoulder 10 on which bears the end of the cheek 8 of the other fish plate which constitutes a male flange and enters owing to its internal flange, in the lower cheek of the other fish plate, which constitutes a female fish plate. The two fish plates are assembled as usual at their upper portions by the bolts 11 tightened by the nuts 12. Bolts 13 tightened by nuts 14 secure together, on the other hand, the lower cheeks 8 of the fish plates, and as a bearing plate 15 pressing under the base 5 of the rail, fits into the angle formed by the two flanges 7, the ends of the rails so secured together have a large bearing surface ensuring the rigidity and the stability of the line.

The invention can be applied to all known types of rails and particularly to double headed rails, care being taken to adapt the shape of the bearing plate to those of the lower portions of the rails.

It is easy to ascertain that, owing to this arrangement, the vertical looseness which always occurs in the systems actually in use owing to the hammering of the vehicle wheels is entirely avoided at the joints. On the other hand the loosening of the assembling bolts caused by the vibrations caused in the former systems can no more occur, owing to the fact that vertical play is prevented. The shiftings of the line are avoided and the security is increased.

Owing to these advantages, in spite of the higher cost of the fish plates established according to the invention, the cost of upkeep of railways will be sensibly reduced, the lines being easily kept in good condition by a system of fish plates having a considerably longer life than the others. Moreover, a great economy will be realized in the cost of upkeep of the rolling stock. The material advantages due to the invention will substantially compensate the increase in the initial cost, while diminishing the risks of accidents.

In the example of Fig. 4, the lower cheeks 8 of the fish plates have the same length as the upper flanges 3. It is obvious however that if the sleepers of the line are too close to each other, the lower cheeks 8 can be made shorter, as shown in Fig. 3.

What we claim is:

1. In a system of fish plates for rails in combination, two rails, two fish plates surrounding the base of the rail and being continued under the said base down to the vicinity of the vertical plane through the axis of the rail, bolts whereby the said fish plates are connected to the rails, internally concave lower cheeks whereby the said fish plates extend downwards, a bearing plate arranged under the base of the rails, means whereby the said lower cheeks of the said fishplates are connected together, a shoulder at the end of one of the said lower cheeks on which bears the end of the lower cheek of the other fish plate.

2. In a system of fish plates for railway rails in combination, two rails, two fish-plates surrounding the base of the rail and being continued under the said base down to the vicinity of the vertical plane through the axis of the rail, bolts whereby the said fish-plates are connected to the rails, internally concave lower cheeks whereby the said fish plates extend downwards, a bearing plate arranged under the base of the rail, bolts whereby the said lower cheeks of the said fish-plates are connected together, a shoulder at the end of one of the said lower cheeks on which bears the end of the lower cheek of the other fish plate entering with its internal flange in the lower cheek of the first fish-plate.

In testimony whereof we affixed our signatures.

JOSEPH MENSCHAERT.
MARCEL VIRGILE JOSEPH MENSCHAERT.